Oct. 22, 1957     L. M. PUSTER     2,810,524
AUTOMOBILE RADIATOR THERMOSTAT

Filed Nov. 4, 1954     4 Sheets-Sheet 1

INVENTOR.
Louis M. Puster.
BY
HIS ATTORNEY

Oct. 22, 1957  L. M. PUSTER  2,810,524
AUTOMOBILE RADIATOR THERMOSTAT
Filed Nov. 4, 1954  4 Sheets-Sheet 3

INVENTOR.
Louis M. Puster.
BY
Albert J. Henderson
HIS ATTORNEY

Oct. 22, 1957 L. M. PUSTER 2,810,524
AUTOMOBILE RADIATOR THERMOSTAT
Filed Nov. 4, 1954 4 Sheets-Sheet 4

INVENTOR.
Louis M. Puster.
BY
Albert J. Henderson
HIS ATTORNEY

United States Patent Office 2,810,524
Patented Oct. 22, 1957

2,810,524

AUTOMOBILE RADIATOR THERMOSTAT

Louis M. Puster, Knoxville, Tenn., assignor to Robertshaw-Fulton Controls Company, Greensburg, Pa., a corporation of Delaware Application November 4, 1954, Serial No. 466,760

4 Claims. (Cl. 236—34)

This invention relates to temperature regulators and more particularly to thermostatic valve control devices designed primarily for use in the cooling system of internal combustion engines.

It has been customary to provide thermostatic valves in the cooling systems of automobiles and truck engines for opening a passageway for a coolant which is circulated, by a pump, through a radiator when such coolant has reached a predetermined high temperature. In the past, the radiator associated with automobiles and truck cooling systems have been relatively large, so as to provide a large radiating area for the coolant.

In recent years, however, the tendency of automobile manufacturers has been to decrease the size of the radiator and to increase the power output of the engine with a consequent greater need for coolant circulation. With the cooling capacity of the present-day engine radiator somewhat decreased and the increase of heat generated by a larger and more powerful engine, it has been necessary to install in the cooling system a more powerful water pump to effect a faster circulation in the cooling system to offset this lessened cooling ability of the system.

In the modern vehicles of today, the cooling system thermostat is subjected to two separate and distinct conditions. The first condition, and the one which has always been present in vehicle cooling systems, is the pressure generated by the coolant. This is the pressure that causes the coolant to circulate through the system and appears, as far as the thermostat is concerned, as a pressure difference between the inlet and outlet side of the thermostat.

The second condition, which is encountered in the modern cooling system, is that of static pressure. In order to increase the boiling point of the coolant and to prevent loss of coolant by evaporation, the cooling system is sealed. Static pressure is generated as the result of vapor pressure of the coolant, and expansion of trapped air and coolant.

In the use of a bellows thermostat, the force involved is the bellows area times the static pressure and assuming there is no change in coolant temperature, the only resisting force operating to maintain the required valve position is the spring rate of the bellows. The vapor pressure of the charge in the thermostat will not change until the temperature has changed. If the valve moves toward the closed position due to an increase in the system's static pressure, less coolant will flow and the coolant temperature will rise. This action continues until the valve position is restored approximately to where it was before. As a result, the engine operating temperature is higher.

In more recent years "fusion type" thermostats have been incorporated in automotive cooling systems in order to eliminate the effect of static pressure on bellows type thermostats. In the use of "fusion type" thermostats, the force on the thermal element is equal to the area of the operating stem times the static pressure, and as is readily apparent, this is a relatively small force. However, while the "fusion type" thermostat is insensitive to static pressures, it does require the use of a balanced valve to overcome the effect of pump pressure.

Heretofore, the cooling systems of automobiles have utilized for the most part valves of the poppet type or of the butterfly type. In the use of poppet valves, it has been found that sudden pressure surges would cause these valves to "blow open" or "blow closed," as the case may be, depending on whether these valves were unbalanced in the open or closed positions. The main drawback of the poppet or butterfly valve is the difficulty of making them such that leakage at high pump pressures does not cause over-cooling at low ambient temperatures. From this it is apparent that proper temperature regulation is lost due to the leakage between the valve members and their seats. Since it is most desirable that the warm-up period of the engine be as rapid as possible, leakage past the valve, during the initial starting of the engine when the valve is closed and the pressure is greatest, will cause considerable delay before sufficient heat is obtained in the cooling system for proper engine efficiency and operation of the vehicle heater.

This invention is directed to thermostatic valve means which avoids the described objections found in the present-day thermostatic control means. In accordance with the present invention, a more powerful force generating valve actuating member is provided and takes the form of the conventional pressure insensitive thermally sensitive element having a casing containing fusible material, such as wax, and a plunger reciprocally related thereto. As is known in the art, volumetric changes in the fusible material caused by various thermal conditions will move the plunger relative to the casing and in this invention is linked in a suitable manner with a valve member to open and close the same in accordance with predetermined minimum and maximum temperatures of the coolant. Means are provided for avoiding the "blow open" and "blow close" effects of instantaneous surges of pressure and to this end, a novel sleeve valve member is utilized to be perfectly balanced and insensitive to pressure. An important feature of the invention is the provision of a sealing device which occupies a position between the sleeve valve member and the housing supporting the same and serves to reduce the leakage past the valve member to a minimum.

An object of this invention is to insure proper temperature regulation in an internal combustion engine using a thermostatic valve assembly which can be economically manufactured and assembled from easily stamped-out parts.

Another object of the invention is to reduce thermostatic valve leakage to a minimum thereby insuring a rapid warm-up during the initial starting period of the engine.

Another object of the invention is to prevent "blow open" and "blow close" actuation of the thermostatic valve member during instantaneous pressure surges of the cooling system.

Another object of the invention is to utilize a balanced valve member which is pressure insensitive for proper response to thermal conditions in the cooling system.

Other objects and advantages will become apparent from the following description taken in connection with the accompanying drawings wherein.

Figure 1:
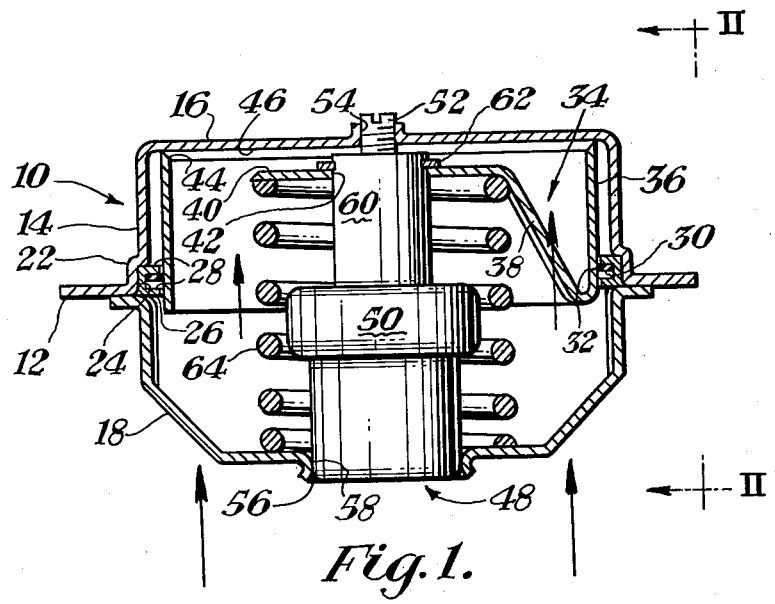
Fig. 1 is a cross section of a thermostatic valve control device embodying the invention.

Embodiment of Fig. 1

Figure 2:
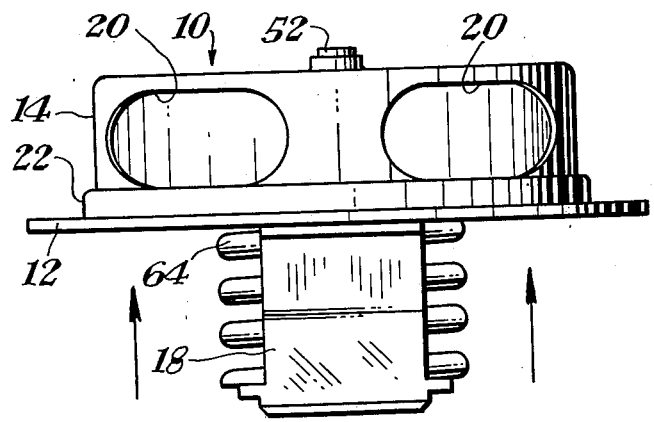
Fig. 2 is an elevational view of the device shown in Fig. 1.

In Figs. 1 and 2, the reference numeral 10 indicates a valve support housing having an outer annular flange 12, a cylindrical portion 14, a plate 16 extending across one open end of the cylindrical portion 14 and a relatively narrow strap 18 extending across the lower open end of the cylindrical portion 14. As shown, the housing 10 is of a form suitable for mounting the same into the cooling system of an internal combustion engine. The cylindrical portion 14 of the housing 10 is provided with suitable apertures 20 which, when the casing is mounted in position, are designed to permit the passage of a coolant through the housing 10 during certain operating conditions of the temperature regulator.

As shown in Fig. 1, the cylindrical portion 14 is formed with a shoulder 22 adjacent the flange 12 of slightly larger diameter than the main body of the cylindrical portion 14 to provide an annular recess 24 for the reception of a circular U-shaped channel 26 secured therein by any suitable means. Loosely retained between the annular rims 28 of the channel 26 is a circular sealing bushing 30 which has a slightly larger radial length than the rims 28. The inner edge 32 of the bushing 30 extends interiorly of the channel 26 beyond the ends of the rims 28 for a purpose to be described hereinafter.

Slidable within the housing 10, is a sleeve valve member indicated generally by the reference numeral 34 and comprising a tubular member 36 and a radially extending generally conical perforated web structure 38 connected to and bridging the lower end of the tubular member 36. The web structure 38 converges axially to an apex disc 40 having an aperture 42 formed therein for a purpose to be described more fully hereinafter. The other end of the sleeve valve member 34 remote from its connection with the web structure 38 projects upwardly as shown in Fig. 1 and is beveled along an edge 44. The interior surface 46 of the plate 16 provides a valve seat for the sleeve valve member 34 by cooperating with the beveled edge 44 thereon when the valve member 34 is in its most upward position, or closed position as shown in Fig. 1.

The sleeve valve member 34 is guided for reciprocal movement in the housing 10 by the abutment of the inner edge 32 of the sealing bushing 30 with the outer surface of the tubular member 36. In operation, the bushing 30 offers very little resistance to the movement of the valve member 34 and no seal between the housing 10 and the valve member 34 when there is no pressure differential across the member 34. Also, the portion of the valve member 34 or its directions of movement has little or no effect on the sealing properties of the bushing 30. However, during a pressure build-up of the cooling system, no matter how slight, the bushing 30 will be forced upwardly toward the upper rim 28 and will also be forced inwardly toward the outer surface of the valve member 34 thereby providing an effective seal whenever a pressure differential exists across the valve member 40.

Mounted interiorly of the housing 10 and the sleeve valve member 34, and concentric therewith, is a thermostatic actuating device indicated generally by the reference numeral 48, for moving the valve member 34 between open and closed positions relative to the plate 16. The thermostatic actuating device 48 is of the conventional form comprising a casing 50, a plunger 52 slidable therein and an expansible fusible material (not shown) disposed within the casing 50 in communication with a portion of the plunger 52. Any suitable fusible material which will give a large volumetric change on passing from the solid to the liquid state at a predetermined temperature may be used and since these devices are known in the art, further details and description are unnecessary. Suffice to say, that this rugged and compact unit when heated to a predetermined temperature is capable of imparting a positive, powerful force and is adapted to be manufactured easily and economically.

The plunger 52 is threadedly secured in a screw threaded aperture 54 formed in the central portion of the plate 16 of the housing 10, and is fixed in position after an initial adjustment thereof by any suitable holding means such as solder (not shown). From this, it is obvious that with a change of state of the fusible material contained in the casing 50, and with the plunger secured to the housing 10, the casing 50 will move downwardly under the force generated by the expanding fusible material. At the lower end of the housing 10, as viewed in Fig. 1, the strap 18 has formed therein an opening 56 in axial alignment with the aperture 54 and has a circular edge 58 for receiving and guiding the casing 50 during the reciprocation thereof.

The casing 50 has a reduced diameter upper portion 60 which is received in the aperture 42 of the apex disc 40. A lock ring 62 of slightly smaller diameter than the aperture 42 and overlying the apex disc 40 is secured to the portion 60 by any suitable means and serves to prevent the casing 50 from moving downwardly relative to the sleeve valve member 34. A coil spring 64 completely surrounds the casing 50 and is held in compression between the upper surface of the strap 18 and the under surface of the apex disc 40. The spring 64 normally biases the sleeve valve member 34 against its valve seat 16 and serves to retain the casing portion 50 of the thermostatic actuating device 48 within the housing 10 substantially as shown in Fig. 1.

Operation of the embodiment of Fig. 1

In the operation of the embodiment of Fig. 1, the housing is positioned in the cooling system of an internal combustion engine so that the flow of coolant from the water pump is in the direction indicated by the various arrows shown in Figs. 1 and 2. The valve member 34 is shown in closed position indicative of the position when the temperature of the coolant is below a predetermined temperature at which full and complete circulation of the cooling system is desired. Upon reaching the desired temperature, the fusible material in the casing 50, being located in the upstream side of the housing 10, will expand and since the plunger 50 is secured to the housing 10, the casing 50 will be forced downwardly against the bias of the spring 64. The sleeve valve member 34 being attached to the upper portion 60 of the casing 50 will be carried with the casing 50 thus moving the beveled edge 44 of the valve member 34 from its seat on the plate 16 and the stream of coolant will be permitted to flow through the web portion 38, around the beveled edge 40, through the channel formed between the tubular member 36 and the cylindrical portion 14 of the housing 10, through the apertures 20 formed therein and into the radiating component of the cooling system. Conversely, upon cooling of the coolant below the desired predetermined temperature, the fusible material will solidify and contract causing the casing 50 to move upwardly by the biasing effect of the spring 64 to permit the bevel edge 44 to seat upon its seat and thus prevent the flow of coolant through the housing 10.

Figure 3:
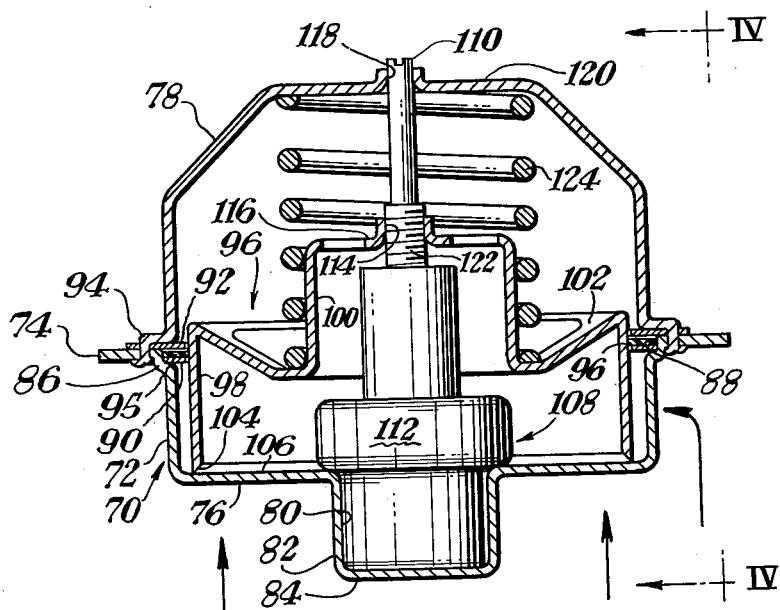
Fig. 3 is a cross section showing a modified form of the invention.

Embodiment of Fig. 3

Figure 4:
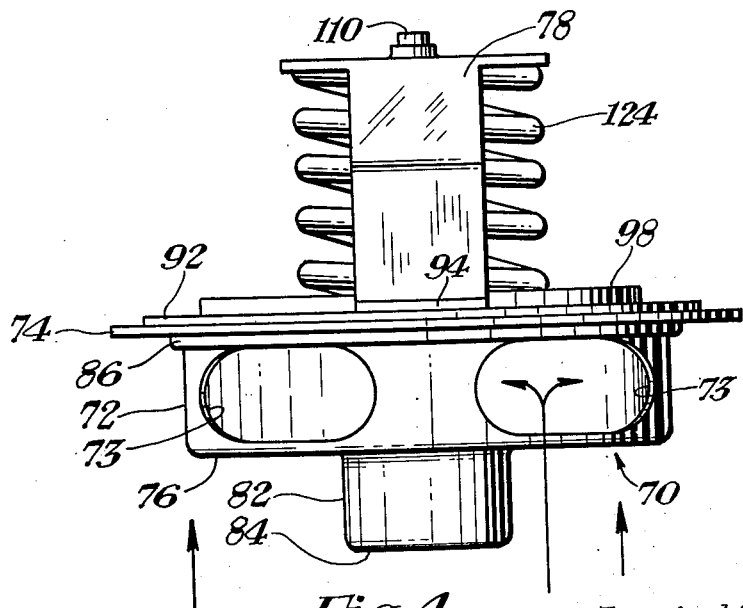
Fig. 4 is an elevational view of the device shown in Fig. 3.

In the modification shown in Figs. 3 and 4, there is shown a housing 70 having a cylindrical portion 72 provided with a plurality of openings 73 for the unrestricted flow of coolant therethrough, an annular flange 74 projecting radially and outwardly from one peripheral end of the portion 72, a wall 76 extending radially and inwardly at the other peripheral end of the portion 72 and an angular strap 78 projecting axially from and extending radially and inwardly of the portion 72 remote from the position occupied by the end wall 76 and being secured to the flange 74 by any suitable means such as brazing or soldering.

The end wall 76 is provided with a well 80 in the center portion thereof and is defined by a tubular wall 82 and an end wall 84. An annular shoulder 86 is formed in the cylindrical portion 72 at its juncture with the flange 74 and serves to provide a recess 88 for receiving a retaining ring 90 secured therein by any suitable means and which encircles the internal surface of the portion 72. Positioned slightly above the ring 90 is a circular mounting washer 92 having an inner diameter equal to that of the ring 90 but of somewhat larger outer diameter for overlying the flange 74. The ends of the strap 78 are bent outwardly to form shoulders 94 which seat upon the washer 92 and secured the same to the flange 74. Interposed between the ring 90 and the washer 92 is a sealing bushing 95 of any suitable material but preferably of rubber base composition. The inner edge 96 of the bushing 95 extends somewhat beyond the inner edge of the ring 90 and the mounting washer 92.

Slidable with the housing 70 is a sleeve valve member indicated generally by the reference numeral 96 and comprising a tubular member 98, a radially off-set concentric tubular sleeve 100 of reduced diameter and a generally conical perforated web structure 102 for connecting one end of each of the elements 98 and 100 substantially as shown in Fig. 3. The other end of the tubular member 98 remote from its connection with the web structure 102 is beveled along an edge 104. The interior surface 106 of the end wall 76 provides a valve seat for the sleeve valve member 96 by cooperating with the beveled edge 104 when the valve member 96 is in its most downward or closed position as shown in Fig. 3.

The sleeve valve member 96 is guided for reciprocal movement within the housing 70 by the abutment of the inner edge of the sealing bushing 95 with the outer surface of the tubular member 98 and this abutment also serves to prevent the leakage of coolant between the tubular member 98 and the cylindrical portion 14 of the housing 70. As was the case in the embodiment of Fig. 1, the bushing 95 extends slightly inwardly beyond the inner edges of the ring 90 and the washer 92 and will be forced upwardly and inwardly during pressure build-up of the coolant thus providing an effective seal between the outside surface of the valve member 96 and the housing 70.

Mounted interiorly of the housing 70 and the valve member 96 and concentric with the tubular member 98 and the sleeve 100 is a thermostatic actuating device 108 of similar construction as that shown in Fig. 1, differing therefrom only by the provision of a longer plunger 110. The casing 112 of the actuating device 108 is press-fitted or otherwise secured to the tubular wall 82 and the end wall 84 of the well 80. The plunger 110 projects upwardly from the casing 112 through a threaded aperture 114 in a perforated end wall 116 which extends across one end of the sleeve 100 and is slidably received in an aperture 118 formed in a flat portion 120 of the strap 78.

It is to be noted that the well 80, member 98, sleeve 90 and the apertures 114 and 118 are all in axial alignment with the casing 112 and the plunger 110. The plunger 110 has a threaded section 122 which cooperates with the threaded aperture 114 thereby providing means for adjusting the relationship between the plunger 110 and the sleeve valve member 96. Any suitable holding means such as solder may be used to secure the threaded portion 122 in the aperture 114 once an adjustment has been made. A coil spring 124 surrounds the sleeve 100 and is held in compression between the undersurface of the flat portion 120 and the web structure 102 and serves to bias the sleeve valve member 96 into engagement with the valve seat 76.

*Operation of the embodiment of Fig. 3*

In the operation of the embodiment of Figs. 3 and 4, the housing 70 is positioned in the cooling system of an engine so that the flow of coolant from the water pump is in the direction indicated by the various arrows and the casing portion 112 of the thermostatic actuating device 108 in the upstream side of the housing 70. The valve member 96 is shown in its closed position so as to prevent the passage of coolant through the housing 96. Upon reaching the desired temperature, the fusible material in the casing 112 will expand and since this portion of the actuating device 108 is secured to the housing 70, the plunger 110 will be forced upwardly carrying with it the valve member 96 thus permitting the stream of coolant to flow through the openings 73 around the edge 104, through the web structure 102 and perforated end wall 116 and out into the radiating section of the cooling system.

Figure 5:
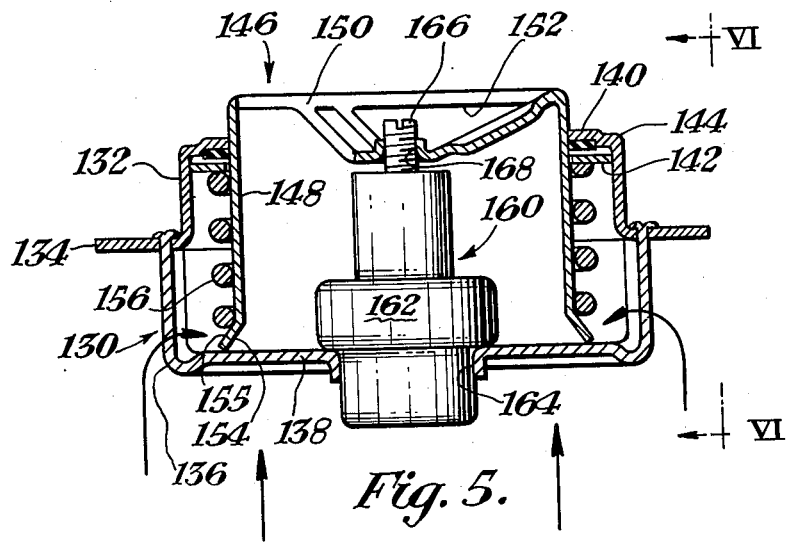
Fig. 5 is a cross section showing another modified form of the invention.

*Embodiment of Fig. 5*

Figure 6:
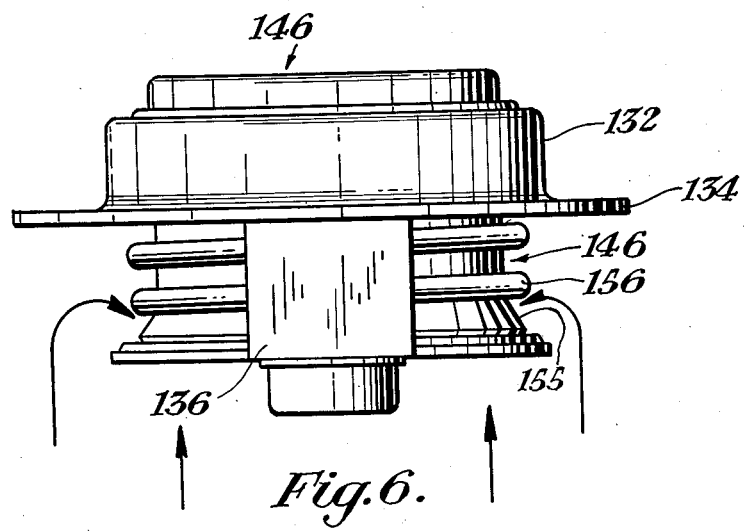
Fig. 6 is an elevational view of the device shown in Fig. 5.

In the modification shown in Figs. 5 and 6, there is shown a housing 130 having a cylindrical portion 132, an annular flange 134 projecting radially and outwardly from one peripheral end of the portion 132, and a strap 136, here shown as of generally U-shaped formation suspended from the portion 132 and secured thereto by any suitable means. The strap 136 includes a center portion formed as a flat circular disc 138 which is disposed in a plane parallel to the plane of the flange 134 and has its axis in alignment with the apexes of the flange 134 and the cylindrical portion 132. The circular disc 138 has a diameter substantially equal to the diameter of the cylindrical portion 132 for a purpose to be described hereinafter.

The portion 132 of the housing 130 is provided with a radially projecting flange 140 at the other end thereof remote from its connection with the strap 136. Slightly underlying the flange 140 and secured by any suitable means to the inner surface of the cylindrical portion 132, is an annular ring 142 which cooperates with the flange 140 to form an annular recess for the reception of a sealing bushing 144. The inner diameters of the flange 140 and the ring 142 are substantially equal but somewhat larger than the inner diameter of the bushing 144 which projects inwardly a slight distance beyond the inner edges thereof. The bushing 144 is similar to those in the embodiments of Figs. 1 and 3 and will be forced upwardly and inwardly during pressure build-up of the coolant thus providing an adequate seal between the outside surface of a sleeve valve member to be described hereinafter and the housing 130.

Slidable within the housing 130 and guided by the inner edge of the bushing 144 is a sleeve valve member indicated generally by the reference numeral 146 and shown as comprising a sleeve portion 148, a spider or web structure 150 extending from the upper end of the sleeve portion 148 and providing a plurality of apertures 152 for the flow of coolant through the sleeve valve member 146, and a flared portion 154 formed at the other end of the valve member 146 remote from the spider 150. The flared portion 154 has a larger outer diameter than the inner edges of the bushing 144, the flange 140 and the ring 142 but has a smaller diameter than the diameter of the disc 138 so that the disc 138 is adapted to completely abut the periphery of the flared portion 154 and serve as a valve seat for the sleeve valve member 146 when in its most downward or closed position as shown in Fig. 5. The cylindrical portion 132 of the housing 130 has a diameter sufficiently larger than the diameter of the flared portion 154 so that adequate clearance exists therebetween to prevent binding or freezing because of dirt and the like when the valve member 146 is in open position.

It is to be noted that the flared portion 154 unbalances the sleeve valve member 146 to a closed position, that is, the flow of coolant, as indicated by the various arrows, is permitted to flow around the upstream end of the sleeve valve member 146 and exert a force on the upper angular surface 155 of the flared portion 154 as viewed in Fig. 4 thereby urging the sleeve valve member 146 upon the valve seat defined by the disc 138. From this, it will also be apparent, that any surges of pressure build-up will tend to lower the valve member 146 upon its seat. The valve member 146 is also normally held against the disc 138 by a coil spring 156 reacting between the upper angular surface of the flared portion 154 and the lower surface of the ring 142.

Mounted interiorly of the housing 130 and the valve member 146 and concentric therewith is a thermostatic actuating device indicated generally by the reference numeral 160 for moving the valve member 146 between open and closed positions relative to the disc 138. The casing 162 of the actuating device 160 is press fitted or otherwise secured into an opening 164 formed in the central portion of the disc 138. At the other end of the actuating device 160, a plunger 166, associated therewith, is threadedly received in a tapped bore 168 formed in the spider 150 and any suitable means such as solder may be employed to secure the plunger 166 therein after an initial adjustment has been made.

Operation of the embodiment of Fig. 5

In the operation of the embodiment of Figs. 5 and 6, the housing 130 is mounted in the cooling system so that the flow of coolant is in the direction indicated by the various arrows. The valve member 146 is shown seated upon the disc 138 so as to prevent the flow of coolant therethrough. Upon reaching the desired temperature, the fusible material in the casing 162 will expand and force the plunger 166 upwardly carrying with it the sleeve valve member 146. The coolant will flow between the flange 134 and the disc 138, around the flared portion 154, through the sleeve portion 148 and through the spider 150 to the remaining portion of the cooling system. Conversely upon cooling of the coolant below the desired temperature, the spring 156 will bias the valve member 146 into closed position such that the flared portion 154 is once again abutting the disc 138. In this operation, during reciprocation of the sleeve member 146, the bushing 144 slides upon the outer surface of the sleeve member 148 and prevents the flow of coolant from escaping past the flange 140.

Figure 7:
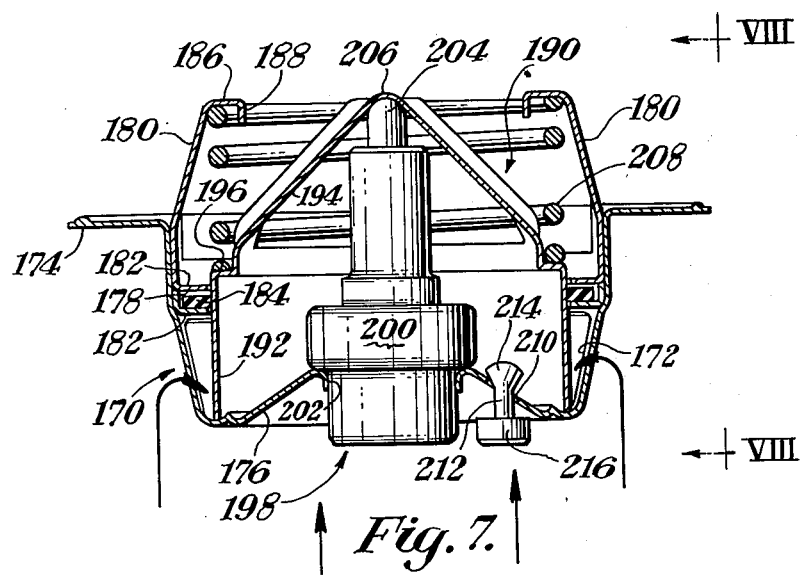
Fig. 7 is a cross section of still another modified form of the invention.

Embodiment of Fig. 7

Figure 8:
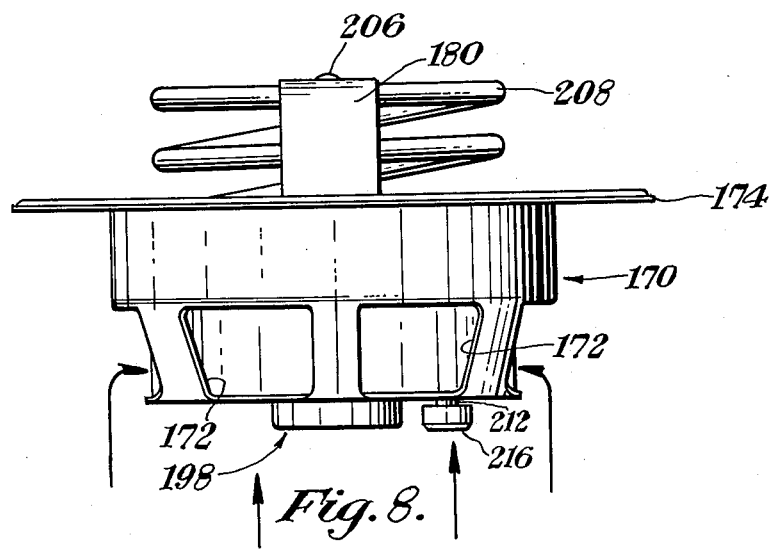
Fig. 8 is an elevational view of the device shown in Fig. 7.

In the modification shown in Figs. 7 and 8, a housing 170 of generally cylindrical formation is formed with a plurality of apertures 172 for the passage of coolant therethrough and is provided with a flange 174 formed at one peripheral end and by a truncated conical end wall 176 formed at the other end thereof. Intermediate the flange 174 and the end wall 176, a U-shaped annular channel 178 is secured to the inner surface of the housing 170 by any suitable means and has projecting upwardly therefrom and integral therewith two diametrically opposed retaining straps 180.

The channel 178 is formed with two annular rims 182 in overlying relationship with respect to each other and these serve to retain a sealing bushing 184 therebetween.

The bushing 184 is similar to those in the embodiments of Figs. 1, 2 and 3 and will be forced upwardly and inwardly during pressure build-up of the coolant thus providing an adequate seal between the outside surface of a sleeve valve member to be described hereinafter and the housing 170. The extreme upper ends 186 of the straps 180 are flanged for a purpose to be described hereinafter.

Concentrically mounted for reciprocation within the housing 170 is a sleeve valve member generally indicated by the reference numeral 190 and which comprises a sleeve section 192, an angular strap 194 connected thereto and a shoulder 196 formed in the connection between the strap 194 and the sleeve 192. The sleeve section 192 has an outside diameter sufficiently small enough to provide adequate clearance between the outside surface thereof and the inner edge of the rings 182 and thus is guided by the rings 182 for reciprocal movement within the housing 170.

It will be apparent from the descriptions in the foregoing embodiments, that the sleeve valve member 190 cooperates with the end wall 176 of the housing 170 to control the flow of coolant therethrough. Valve actuating means in the form of a thermostatically actuating device 198 is provided and is identical with those employed in the previous disclosures. Such a device includes the usual casing 200 secured as by press fitting into an opening 202 formed in the medial portion of the end wall 176 and a plunger 204 projecting upwardly from the casing 198, as viewed in Fig. 7.

As previously stated, the end wall 176 is of conical configuration, and as shown in Fig. 7, extends interiorly of the sleeve valve member 190 thus providing a suitable compact and rugged anchor means for the casing 200 and at the same time allows a greater area of the casing 200 to be exposed to the coolant.

The strap 194 is suitably bent to form an apex 206 for receiving the outer extremity of the plunger 204. A coil spring 208 is held in compression between the flanges 186 and the shoulder 198 formed on the valve member 190 and serves to bias the valve member 190 upon its seat 176.

An aperture 210 is formed in the end wall 176 for receiving a "jiggle" pin 212 which is retained therein by means of a flattened flared portion 214 at one end of the pin 212 and a piston 216 at the other end thereof. The pin 212 serves as a check valve to vent air that may otherwise be trapped in the cooling system below the housing 170. However, during the warm-up period of the cooling system when the pressure below the housing is maximum or near maximum and the sleeve valve member is in closed position, the pin 212, being subjected to the pressure, will occupy a position such that the top surface of the piston 214 will bridge across the aperture 210 for preventing appreciable leakage of the coolant through the housing 170 when the valve member 190 is closed. It is to be understood that the "jiggle" pin 212 is shown in the modification of Fig. 7 for illustrative purposes only, that it may be adapted for any of the previously disclosed modifications without departing from the scope of the invention.

Operation of the embodiment of Fig. 7

The operation of the embodiment of Figs. 7 and 8 is similar to that of the previous embodiments with the housing 170 mounted in the cooling system so that the flow of coolant is in the direction indicated by the various arrows and the casing 200 in the upstream side of the housing 170. When the coolant reaches the desired temperature, the plunger is forced upwardly carrying with it the strap 194 and the sleeve section 192, so that the coolant is permitted to flow through the apertures 172, between the lower end of the sleeve 192 and the valve seat defined by the end wall 176, through the sleeve 192 and the strap 194 and out into the radiating section of the cooling system. Conversely, when the temperature of the coolant lowers sufficiently below the desired temperature, the plunger 204 retracts into the casing 200 and allows the spring 208 to force the valve member upon its seat 176 and prevent the flow of coolant through the housing 190.

It will therefore be apparent that by the present invention a temperature regulator has been provided for internal combustion engines which avoids "blow down" and "blow close" conditions by the provision of a suitable thermostatic actuating device having sufficient power capacity to overcome relatively large pressure build-ups and surges and by the provision of various forms of sleeve valves which are insensitive to pressures in the cooling system. Furthermore, to minimize leakage between the component housing and valve structure, a novel sealing means is provided and this has the effect of assuring a more rapid warm-up period for the engine.

While the embodiment of the invention has been shown and described with considerable particularity, it is to be understood that the invention is not restricted thereto and as the same is capable of receiving a variety of mechanical expressions, as will now be apparent to those skilled in the art. It will be understood that many changes may be made in the details of construction and arrangement of parts without departing from the scope of this invention as defined in the appended claims.

I claim:

1. In a temperature regulator, a first housing having an apertured side wall for inlet of fluid to said housing and an end wall, said end wall having an annular valve seat portion and an axial opening defining a supporting wall portion, a second housing having an annular side wall portion secured to said first housing side wall and having an end wall spaced from said first housing end wall, a sleeve valve member having an outer wall spaced from said first and second housing side walls to form an annular fluid chamber, said valve member having an annular seating surface operatively engageable with said valve seat portion and an apertured end wall providing communication with the interior of said valve member, said valve member being formed with an annular shoulder adapted to be spaced from said second housing end wall, a coil spring seated on said shoulder and operatively associated with said second housing end wall for biasing said valve member and causing movement of said seating surface into said operative engagement for controlling inlet of fluid to the interior of said valve member, annular sealing means projecting beyond said first and second housing side walls and operatively engageable with said valve member outer wall, said sealing means being cooperable with said valve seat and said valve member in said biased position to form an end wall of said chamber and prevent passage of fluid exteriorly of said valve member, and thermostatic power means mounted on said supporting wall portion and operatively engageable with said valve member end wall for overcoming the bias of said spring and permitting flow of fluid to the interior of said valve member and said apertured end wall thereof.

2. In a temperature regulator, a first housing having an apertured side wall for inlet of fluid to said housing and an end wall, said end wall having an annular valve seat portion and an axial opening defining a supporting wall portion, a second housing having an end wall spaced from said first housing end wall and a pair of oppositely disposed side wall portions connected to said apertured side wall, a sleeve valve member having an outer wall spaced from said first and second housing side walls to form an annular fluid chamber, said valve member having an annular seating surface operatively engageable with said valve seat portion and an apertured end wall providing communication with the interior of said valve member, said valve member being formed with an annular shoulder adapted to be spaced from said second housing end wall, a coil spring seated on said shoulder and operatively associated with said second housing end wall for biasing said valve member and causing movement of said seating surface into said operative engagement for controlling inlet of fluid to the interior of said valve member, annular sealing means supported by said first housing side wall at the junction with said second housing side wall portions and projecting therebeyond for operative engagement with said valve member outer wall, said sealing means being cooperable with said valve seat and said valve member in said biased position to form an end wall of said chamber and prevent passage of fluid exteriorly of said valve member, annular guide means secured between said first and second housing side wall portions and operatively associated with said sealing means and said valve member outer wall for guiding said valve member during movement thereof, and thermostatic power means mounted on said supporting wall portion and operatively engageable with said valve member end wall for overcoming the bias of said spring and permitting flow of fluid to the interior of said valve member and said apertured end wall thereof.

3. In a temperature regulator, a first housing having a pair of oppositely disposed side wall portions for inlet of fluid to said housing and an end wall, said end wall having an annular valve seat portion and an axial opening defining a supporting wall portion, a second housing having an annular side wall portion secured to said first housing side wall portion and having an apertured end wall spaced from said first housing end wall, a sleeve valve member having an outer wall spaced from said first and second housing side walls to form an annular fluid chamber, said valve member having an annular seating surface operatively engageable with said valve seat portion and an apertured end wall projecting through said second housing end wall, said valve member end wall providing passage for fluid from the interior of said valve member, said valve member being formed with an annular flared shoulder adapted to be spaced from said second housing end wall, a coil spring seated on said shoulder and operatively associated with said second housing end wall for biasing said valve member and causing movement of said seating surface into said operative engagement for controlling inlet of fluid to the interior of said valve member, annular sealing means supported by said second housing end wall and projecting therebeyond for operative engagement with said valve member outer wall, said sealing means being cooperable with said valve seat and said valve member in said biased position to form an end wall of said chamber and prevent passage of fluid exteriorly of said valve member, annular guide means positioned between said coil spring and said sealing means and operatively engageable with said valve member outer wall for guiding said valve member during movement thereof, and thermostatic power means mounted on said supporting wall portion and operatively engageable with said valve member end wall for overcoming the bias of said spring and permitting flow of fluid to the interior of said valve member and said apertured end wall thereof.

4. In a temperature regulator, a first housing having an apertured side wall for inlet of fluid to said housing and an end wall, said end wall having an annular valve seat portion and an axial opening defining a supporting wall portion, a second housing having a pair of oppositely disposed side wall portions connected to said apertured side wall and each having an inturned portion forming an end wall spaced from said first housing end wall, a sleeve valve member having an outer wall spaced from said first and second housing side walls to form an annular fluid chamber, said valve member having an annular seating surface operatively engageable with said valve seat portion and a strap portion opposite said seating surface providing communication with the interior of said valve member, said valve member being formed with an annular shoulder at the junction of said strap portion adapted to be spaced from said second housing end wall, a coil spring seated on said shoulder and operatively associated with said second housing end wall for biasing said valve member and causing movement of said seating surface into said operative engagement for controlling inlet of fluid to the interior of said valve member, said second housing having an annular flanged end portion opposite said inturned end wall and operatively engageable with said valve member outer wall, an annular flange secured to said first housing side wall and operatively engageable with said valve member outer wall adjacent said annular flanged end portion, annular sealing means supported by said annular flange for limited axial movement relative to said flanged end portion and projecting therebeyond for operative engagement with said valve member outer wall, said sealing means being cooperable with said valve seat and said valve member in said biased position to form an end wall of said chamber and prevent passage of fluid exteriorly of said valve member, said flanged end portion and said annular flange being operable for guiding said valve member during movement thereof, and thermostatic power means mounted on said supporting wall portion and operatively engageable with said valve member end wall for overcoming the bias of said spring and permitting flow of fluid to the interior of said valve member and said apertured end wall thereof.

References Cited in the file of this patent

UNITED STATES PATENTS

| | | |
|---|---|---|
| 1,639,299 | Kinnard | Aug. 16, 1927 |
| 2,174,042 | Rose | Sept. 26, 1939 |
| 2,356,958 | Wangenheim | Aug. 29, 1944 |
| 2,620,133 | Obermaier | Dec. 2, 1952 |
| 2,752,941 | Mitchell | July 3, 1956 |
| 2,754,062 | Wangenheim | July 10, 1956 |